(12) United States Patent
van Laack et al.

(10) Patent No.: US 10,627,913 B2
(45) Date of Patent: Apr. 21, 2020

(54) METHOD FOR THE CONTACTLESS SHIFTING OF VISUAL INFORMATION

(71) Applicant: Visteon Global Technologies, Inc., Van Buren Township, MI (US)

(72) Inventors: Alexander van Laack, Aachen (DE); Stephan Preussler, Alfter (DE); Tina Friedrich, Cologne (DE); Jennifer Fay Wendt, Harsewinkel (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 15/593,653

(22) Filed: May 12, 2017

(65) Prior Publication Data

US 2017/0329411 A1  Nov. 16, 2017

(30) Foreign Application Priority Data

May 13, 2016  (DE) .......................... 10 2016 108 885

(51) Int. Cl.
| | | |
|---|---|---|
| *G06F 3/01* | (2006.01) | |
| *G06F 3/042* | (2006.01) | |
| *B60K 35/00* | (2006.01) | |
| *B60K 37/06* | (2006.01) | |

(52) U.S. Cl.
CPC .............. *G06F 3/017* (2013.01); *B60K 35/00* (2013.01); *B60K 37/06* (2013.01); *G06F 3/012* (2013.01); *G06F 3/0425* (2013.01); *B60K 2370/11* (2019.05); *B60K 2370/146* (2019.05); *B60K 2370/149* (2019.05); *B60K 2370/1464* (2019.05); *B60K 2370/151* (2019.05); *B60K 2370/152* (2019.05); *B60K 2370/182* (2019.05); *B60K 2370/52* (2019.05); *B60K 2370/736* (2019.05); *B60K 2370/744* (2019.05)

(58) Field of Classification Search
CPC ............................... G06F 3/017; G06F 3/0425
USPC .......... 345/156–184; 340/435; 715/765, 863; 348/47, 54
See application file for complete search history.

(56) References Cited

U.S. PATENT DOCUMENTS

| | | | | |
|---|---|---|---|---|
| 5,781,165 A | * | 7/1998 | Tabata | G02B 27/017 345/8 |
| 8,547,356 B2 | * | 10/2013 | Maloney | G06Q 10/00 345/173 |
| 2007/0165019 A1 | * | 7/2007 | Hale | G06Q 10/00 345/418 |

(Continued)

FOREIGN PATENT DOCUMENTS

| | | |
|---|---|---|
| DE | 102010056411 A1 | 6/2012 |
| WO | 2013104376 A1 | 7/2013 |

OTHER PUBLICATIONS

Examination Report issued in German Application No. 102016108885.4 dated Feb. 13, 2017.

*Primary Examiner* — Prabodh M Dharia
(74) *Attorney, Agent, or Firm* — Quinn IP Law

(57) ABSTRACT

A method for the contactless shifting of visual information includes detecting at least one viewing direction to detect visual information in a first display area, and a movement of a hand and/or a movement of a head of a user toward a second display area. After the detection of the visual information in the first display area, and after the detected motion indicating a shift, the visual information is shown in the second display area upon the completion of the pivoting movement or movements.

20 Claims, 3 Drawing Sheets

(56) References Cited

U.S. PATENT DOCUMENTS

| | | | | |
|---|---|---|---|---|
| 2008/0127065 A1* | 5/2008 | Bryant | ............... | G05B 19/056 |
| | | | | 717/109 |
| 2008/0314807 A1* | 12/2008 | Junghanns | ........... | B01D 61/025 |
| | | | | 210/85 |
| 2012/0154305 A1* | 6/2012 | Nunomaki | .......... | G06F 3/04883 |
| | | | | 345/173 |
| 2012/0176483 A1* | 7/2012 | Border | ............... | G02B 27/017 |
| | | | | 348/54 |
| 2012/0272179 A1 | 10/2012 | Stafford | | |
| 2013/0162632 A1* | 6/2013 | Varga | ................... | G06T 19/006 |
| | | | | 345/419 |
| 2014/0098185 A1* | 4/2014 | Davari | ............. | H04N 5/23238 |
| | | | | 348/36 |
| 2014/0098195 A1* | 4/2014 | Pace | ................ | H04N 13/0242 |
| | | | | 348/47 |
| 2014/0237432 A1* | 8/2014 | Geurts | .................. | G06F 3/005 |
| | | | | 715/863 |
| 2014/0368324 A1* | 12/2014 | Seifert | ................. | G08G 1/166 |
| | | | | 340/435 |
| 2015/0130740 A1* | 5/2015 | Cederlund | ............. | G06F 3/014 |
| | | | | 345/173 |
| 2015/0234467 A1* | 8/2015 | Tachibana | .............. | G06F 3/017 |
| | | | | 715/863 |
| 2015/0234569 A1* | 8/2015 | Hess | ..................... | B60K 35/00 |
| | | | | 345/156 |
| 2016/0004418 A1* | 1/2016 | Lee | ...................... | B60K 35/00 |
| | | | | 715/765 |
| 2016/0116995 A1* | 4/2016 | Wilson | ................... | G06F 3/017 |
| | | | | 345/157 |
| 2016/0353058 A1* | 12/2016 | Caviedes | .............. | H04N 7/147 |
| 2017/0177957 A1* | 6/2017 | Yokochi | ................. | H04N 5/77 |
| 2017/0206691 A1* | 7/2017 | Harrises | ................. | G06T 11/60 |

\* cited by examiner

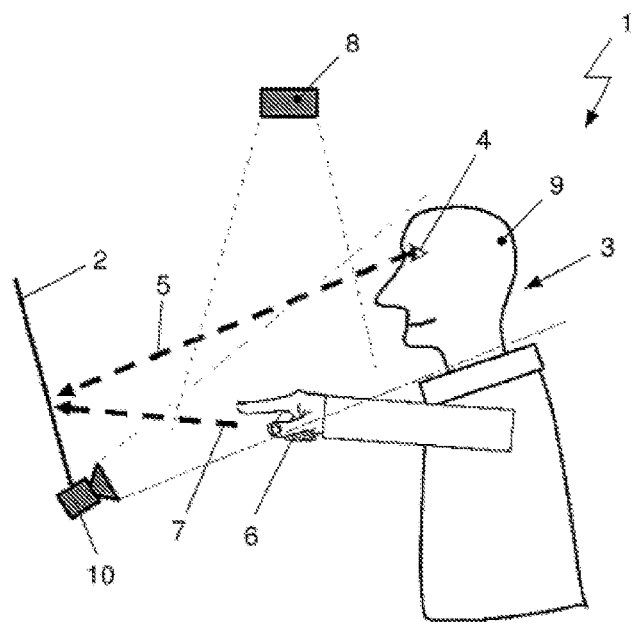
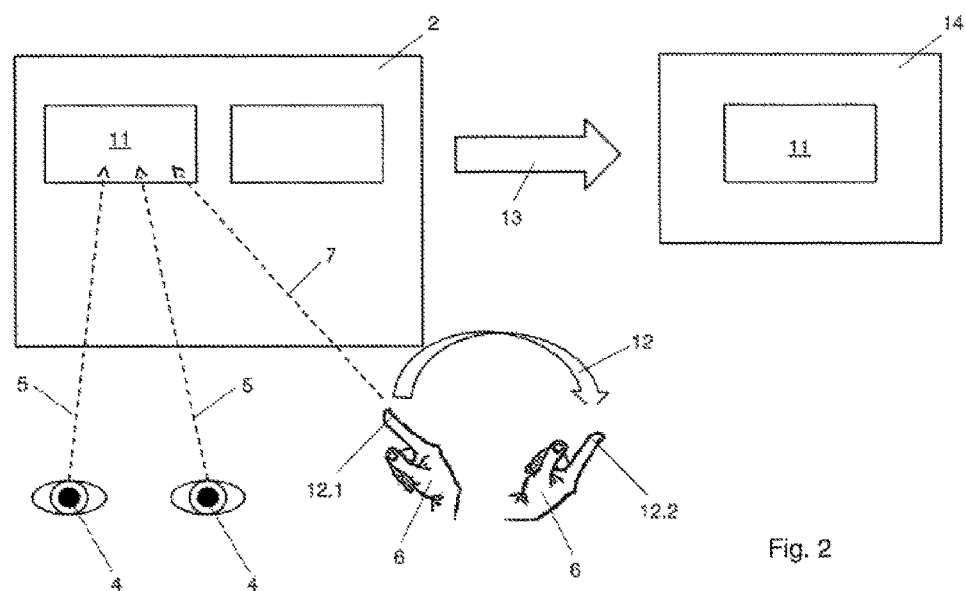

METHOD FOR THE CONTACTLESS SHIFTING OF VISUAL INFORMATION

CROSS-REFERENCE TO RELATED APPLICATION

This U.S. Patent Application claims priority to German Patent Application No. 10 2016 108 885.4, filed May 13, 2016, entitled "Method for the Contactless Shifting of Visual Information," the entire disclosure of the application being considered part of the disclosure of this application and hereby incorporated by reference.

BACKGROUND

Safe driving of a motor vehicle requires a certain amount of attention and concentration by the driver. Display elements and operating elements are therefore displayed in the visual area of the vehicle driver in such a manner that the vehicle driver is distracted as little as possible from what is happening in the traffic. This is achieved, for example, by using a head-up display with which visual information, for example in the form of virtual operating elements can be projected onto the windshield. The inputting of control commands for the interaction and operating of virtual operating elements can take place without contact. For example, a movement pattern of a hand of the vehicle driver is detected optically by a camera or in a capacitive-sensory manner. Although such systems improve operability and a safer driving possible, it can be disadvantageous in certain driving situations if driver information is presented.

The vehicle driver can be easily overwhelmed in difficult traffic situations, in particular by the presentation of information that requires an interaction of the vehicle driver. In such instances, it can be necessary that the inserted information is removed as rapidly as possible out of the visual area in order to not unnecessarily distract the vehicle driver.

Methods are known in which displayed contents can be shifted by simple hand gestures. Thus, it is provided in a method known from DE 10 211 112 447 A1 to shift graphical objects from a first display surface to a second display surface. A control takes place here by the interpreting of hand gestures of the user which are detected optically by a camera.

DE 10 2009 032 069 A1 teaches a method in which a gesture of the driver includes a horizontal movement in the direction of the front-seat passenger is associated with a control command which brings it about that the information content provided for the driver's side is also displayed for the front-seat passenger's side.

Another method in which displayed contents are transferred from a display unit without contact to another display unit is apparent from WO 2013/104376 A1, wherein the transfer of the displayed content is initiated by a pivoting movement of a hand of the user.

According to the methods known from the prior art, the detection and delegation of display contents is based on a sensory or optical camera detection and the interpretation of hand movements or hand gestures of a user. The interpretation and association of control commands is therefore a function of only one input source. This has the disadvantage that hand movements or hand gestures of the user which were erroneously made or erroneously detected cannot be corrected, so that control commands are not recognized or are erroneously interpreted. Therefore, it can occur that a gesture must be multiply executed until the desired control command is recognized.

SUMMARY

The disclosure relates to a method for the contactless shifting of visual information between spatially decoupled display areas, in particular between a first display area inside a motor vehicle and a second display area which is spatially decoupled.

Visual information can be removed from the visible area of the vehicle driver and displayed on another display medium by a simple shifting. However, visual information can be coupled with other functions which require an interaction with a user. It is therefore desired that information removed or shifted out of the visual area is made accessible for other vehicle passengers or other users so that an interaction required with the information can be executed by another user.

The disclosure address issues involved with contactless shifting of visual information between spatially decoupled display areas.

The methods disclosed herein provide contactless shifting of visual information with at least one viewing direction and one hand movement and/or a head movement of a user (who may be a driver of a vehicle). Once the above is detected, the hand movement and/or a head movement combined with a viewing direction is associated with a control command for shifting visual information shown in a first display area to at the second display area, the second display area being spatially decoupled from the first display in the vehicle. The control command is initiated by a pivoting movement of the hand and/or of the head of the user, wherein when the pivoting movement or movements is/are completed, the visual information is displayed in the other display area.

According to the aspects disclosed herein, the control command for shifting the visual information is executed by a combination of a viewing direction and a pivoting movement of the hand of the user or by a combination of a viewing direction and a pivoting movement of the head of the user. Thus, the control command is executed by a combination of a viewing direction and of a pivoting direction of the hand and of the head of the user.

As a result of the fact that for the association of the control command a combination of several input sources is taken into account, the control command for shifting the visual information can be detected with improved accuracy and can therefore be more rapidly executed. The detection of the viewing direction and the detection of the movement of the hand and/or of the head of the user preferably take place simultaneously in order to achieve a high probability for an association of the control command. As a result of the taking into account of several input sources, there is furthermore the possibility of an erroneous compensation in the case of an erroneously executed or erroneously detected pivoting movement. Therefore, it can be provided according to the method according to the invention that an erroneously executed and/or erroneously detected pivoting movement of the hand of the user can be compensated by a simultaneously executed and successfully detected pivoting movement of the head of the user, wherein simultaneous does not mean any exact coincidence in time since the movements of the user can take place in a tolerance range which is slightly offset in time.

In the sense of the invention the term pivoting movement denotes a trajectory executed by the hand or with the head of the user from a starting point to an end point.

A pivoting movement executed by the hand and/or by the head can be graphically reported back to the user in that the visual information is pushed in a path curve out of the display area and in a path curve into the second display area. A successful shifting of the visual information can preferably be reported back acoustically, haptic-ly and/or visually.

According to the method disclosed herein, visual information is shifted between spatially decoupled display areas in which one display area is the visually displayable area of a display unit or of a display device. According to the aspects disclosed herein, the display areas are spatially delimited from one another.

A piece of visual information may be defined as visual signals displayed to the user by a display unit in a display area. Therefore, the visual information can be virtual operating elements by which the technological interior of the vehicle such as, for example, an air conditioning system or a navigation system can be operated. Furthermore, even traffic information or information for communication such as, for example, incoming calls or text messages can be displayed with the visual information.

According to the method, visual information to be shifted can advantageously be selected or marked by the viewing direction of the user. The visual information can be detected by the user in that the user aims at the displayed visual information with his look. In order to report back to the user a successful detection of the aimed-at visual information, the aimed-at visual information can be emphasized by a graphic effect such as, for example, a reduction of color, a virtual focus in which the aimed-at information is represented more sharply in contrast to the environment, or by an enlarged representation. Furthermore, it can also be provided that a reply about the detection of the aimed-at visual information is combined with an acoustic or haptic signal.

According to an embodiment, the visual information can be shifted by the initiated control command from the first display area in the vehicle to all display areas present in the vehicle. In another advantageous embodiment of the method of the invention it can be provided that the visual information is shifted into a display area to which the look and/or a finger of the user is directed.

The visual information can preferably be shifted into a display area to which a finger of the user is directed upon the completion of the pivoting movement of his head and/or of his hand.

Furthermore, it can also be provided that the visual information can be shifted into a display area to which the look of the user is directed upon the completion of the pivoting movement of his head and/or of his hand. The visual information can advantageously be shifted into a display area desired by the user.

According to another embodiment, it can be provided that the visual information is shifted into a display area associated with another user. In this instance the visual information is shifted into a display area which is associated with a certain user such as, for example, the front-seat passenger. Therefore, certain display areas can be pre-set which are prioritized for showing shifted visual information.

Furthermore, it can also be provided that during the shifting of the visual information into a second display area operating rights and/or user rights coupled to the visual information are transmitted. As a result of the transfer of operating rights it is possible for other users to interact with the visual information and to execute, if necessary, functions coupled to the visual information. This is especially advantageous if inserted visual information requires an interaction with the vehicle driver but it is not possible at this moment due to the traffic situation for the vehicle driver to execute the interaction. In this instance the required interaction can take place by another user to which the user rights and/or operating rights are associated by the shifting of the visual information into a display area associated with him.

According to a variant of the embodiments, during the shifting of the visual information, user rights coupled with the visual information may be transferred to be associated with at least one other user. As a consequence, user rights can be transferred to users who have an appropriate suitability for executing functions coupled with the visual information.

According to another advantageous embodiment of the method according to the invention the visual information can be transferred to a display area associated with a seat of the motor vehicle if a user is registered for the seat. In this case the sensory mechanism for detecting vehicle passengers, which is inside the motor vehicle, can be used.

Furthermore, the method can be carried out according to a variant in which the control unit is combined with acoustical information of the user for shifting the visual information. In this manner the location and/or a user can be indicated to which the visual information should be shifted by a speech command. In addition, language recognition can advantageously be provided with which the acoustical signals of the user can be interpreted.

According to another advantageous embodiment of the method the visual information can be shifted into a display area of a mobile end device such as, for example, of a smartphone. Therefore, the method of the invention can be advantageously carried out even if no other second display area which is spatially decoupled from the first display area in the vehicle is present in the vehicle. The visual information with the mobile end device can also be advantageously used outside of the motor vehicle.

Furthermore, it can be provided that mobile end devices which comprise a display area or are coupled to a display area are bundled into a communication network or are registered in a communication network for carrying out the method of the invention. Therefore, mobile end devices such as, for example smartphones or smartwatches can be bundled into a communication network of a motor vehicle if they are in the vehicle or at a predetermined distance from the vehicle.

Other bundled display areas can be shown in the first display area in the vehicle as visual information. Visual information representing a second display area is preferably graphically displayed on an edge of the display area inside the vehicle. Visual information detected by the user can be shifted into the second display area if the look and/or a finger of the user is directed onto the visual information representing the second display area.

Another embodiment can provide that the visual information is shifted into a second display area localized outside of the motor vehicle. In this manner the visual information can be shifted, for example, into a display area which is localized at a pre-set network address. The user can advantageously pre-set display areas into which the visual information is to be shifted. In this manner the user can shift the visual information, for example, into the display area of a display of a home computer, which is especially advantageous in the case of visual information in the form of rather long text messages such as, for example, in the case of emails.

During the process of the shifting of the visual information the data representing the visual information can be transmitted by a wireless network. In this manner the data representing the visual information can be transmitted, for example, by a mobile radio network or by a WLAN network.

A communication system of the motor vehicle can be used for transmitting the data representing the visual information inside a motor vehicle. However, it can also be provided that the data representing the visual information is transmitted via Bluetooth or WLAN.

BRIEF DESCRIPTION OF THE DRAWINGS

Other details, features and advantages of embodiments of the invention result from the following description of exemplary embodiments with reference made to the associated drawings. In the drawings:

FIG. 1 shows a schematic view of an arrangement for using the method according to the aspects disclosed herein, and FIG. 2 shows a schematic view for explaining the functioning of the method of FIG. 1.

DETAILED DESCRIPTION

Figure 3:
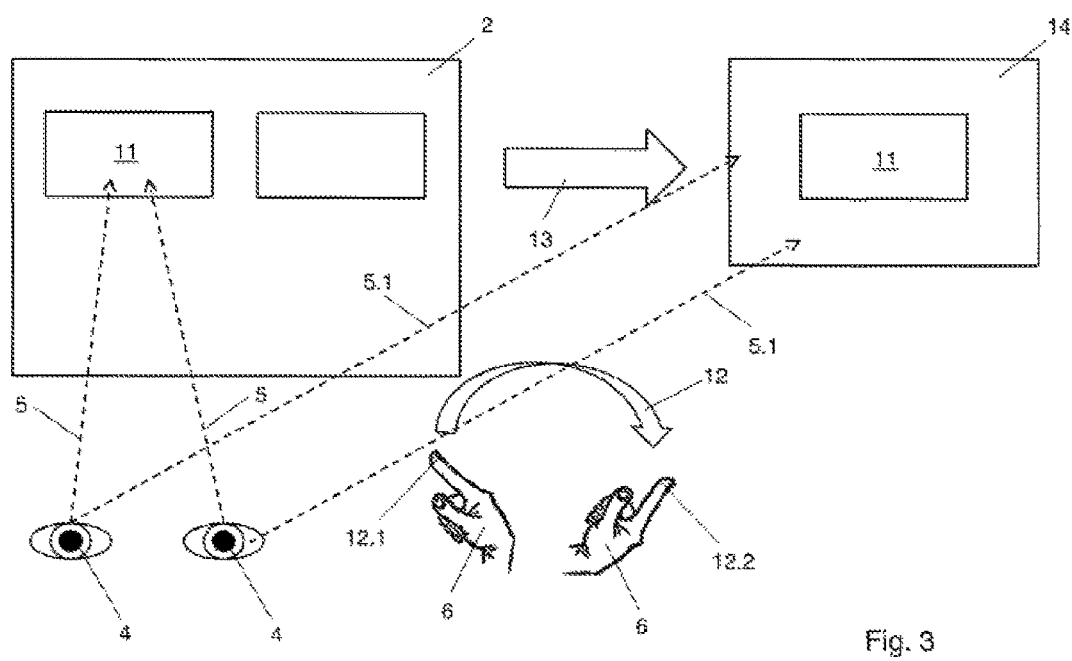
FIG. 3 shows a schematic view for explaining an embodiment of the method according the aspects disclosed herein.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

FIG. 1 shows a schematic view of an arrangement 1 for using the method according to the invention. The arrangement 1 comprises a first display area 2 and at least one second, not shown, other display area for displaying visual information, a sensor 10 for detecting movements of the eye 4 and therefore for detecting the viewing direction 5 of the eyes 4 of the user 3 as well as a sensor 8 for detecting movements of the hand 6 and of a pointing direction 7 of the index finger of the hand 6 of the user 3. The user 3 can be the driver of the motor vehicle.

In a variant which is not shown here the arrangement 1 can alternatively or additionally to the sensor 10 for detecting movements of the eye 4 also comprise a sensor for detecting the movement of the head 9 of the user 3.

FIG. 2 shows a schematic view for explaining the functioning of the method of the invention when used in an arrangement 1, as is shown in FIG. 1.

A piece of visual information is characterized by the reference numeral 11 and which is shown in the first display area 2 which can be, for example, the projected display area of a head-up display. In the present example the visual information 11 is shown as a rectangular switching surface which is coupled to a function for activating a navigation system. Reference numeral 5 characterizes the viewing direction of the eyes 4 of the user 3, wherein the look in viewing direction 5 is directed onto the visual information 11 represented by the rectangular switching surface. Furthermore, the hand 6 of the user 3 is shown, wherein an index figure is directed in the pointing direction 7 toward the visual information 11. The arrow characterized by the reference numeral 12 represents a pivoting movement 12 executed by the hand 6 of the user 3 which begins at the starting point 12.1 and terminates at the endpoint 12.2. The pivoting movement 12 takes place here, for example, in the air or on a surface.

The reference numeral 14 characterizes another, second display area 14 spatially decoupled from the first display area 2. It can be another display area 14 localized in the motor vehicle and such as an instrument display, a display arranged integrated in the seat for passengers on the back seat, or computer displays. However, there is also the possibility that the display area 14 is the display of a smartphone which can be present in the motor vehicle or outside of the motor vehicle. Furthermore, it is conceivable that the display area 14 is a display of a home computer localized at a pre-set network address. The visual information 11 represented by the rectangular switching surface is displayed in the display area 14 after it was shifted from the first display area 2. The shifting 13 of the visual information 11 from the first display area 2 into the second display area 14 is appropriately represented by a transfer arrow, wherein a transfer technology is used for transferring the data representing the visual information 11 from a device coupled to the first display area 2 to a device coupled to the second, other display area 14.

For the contactless shifting of the visual information 11 shown in the first display area 2 into the spatially decoupled, second display area 14, the viewing direction 5 and the pivoting movement 12 of the hand 6 and/or of the index finger of the user 3 are detected. The detecting of the viewing direction 5 can take place, as is shown, for example, in FIG. 1, by a sensor 10 for detecting movements of the eye 4, wherein for the detecting of the movement of the hand 6 a capacitive or optical camera sensory mechanism can be used. Alternatively or additionally to the detecting of the movement of the hand 6, the movement of the head 9 of the user 3 can also be detected.

In the present example the user 3 aims at the visual information 11 with his eyes 4 and the index finger of his hand 6. In order to detect or mark the visual information 11 aimed at by the user 3, the viewing direction 5 and the pointing direction 7 are combined, wherein a successful detecting of the selected visual information 11 is reported back to the user 3 by graphically emphasizing the visual information 11.

In another embodiment it can also be provided that the selection and detection or marking of the visual information 11 takes place exclusively by the viewing direction 5 or exclusively by the pointing direction 7. Furthermore, an embodiment is also conceivable in which a selection and detection of the visual information 11 is realized in that the user 3 touches a user surface.

According to the method of the invention, in the present example a pivoting movement 12 of the hand 6 combined with the viewing direction 5 in which the index finger of the hand 6 is pivoted from the starting point 12.1 to the end point 12.2 is associated with a control command by which a shifting 13 of the visual information 11 is initiated. Upon the completion of the pivoting movement 12 at the end point 12.2 the visual information 11 is displayed in the second display area 14.

During the shifting 13 of the visual information 11 into the second display area 14 the data representing the visual information 11 and the user rights coupled with the visual information 11 are transferred by a wireless network to the device coupled to the second display area 14. As a consequence, it is possible that functions coupled to the visual information 11 can be executed starting from the second display area 14.

In the present example the navigation system can be turned on and operated by the second display area 14. It can be provided that a bidirectional communication connection is established between the device coupled to the first display area 2 and the device coupled to the second display area 14.

The method according to the invention can be designed in such a manner that the visual information 11 is shifted onto all other display areas 14 present in the motor vehicle if the pivoting movement 12 is executed as a free, non-specific movement in space. Furthermore, it can also be provided that a directed pivoting movement 12 is executed in which the visual information 11 is shifted into several other display areas 14 which are arranged in the direction of the executed pivoting movement 12. In this manner a pivoting movement 12 which is directed from front to back relative to the user 3 can bring it about that the visual information 11 is shifted only to display areas 14 arranged in the back motor vehicle area.

In another embodiment of the method according to the invention it can also be provided that the visual information 11 is shifted into a second display area 14 to which the finger of the hand 6 and/or the look of the eyes 4 of the user 3 is/are directed. A shifting of the visual information 11 then takes place only into the second display area 14 aimed at by the finger and/or by the look of the user 3.

FIG. 3 shows a schematic view for explaining an embodiment of the method according to the invention. In distinction to the embodiment shown in FIG. 2, the visual information 11 shown in the display area 2 as a rectangular field is detected only by the viewing direction 5 of the eyes 4 of the user 3. Furthermore, a change to viewing direction 5.1 of the eyes 4 of the user 3 onto the second display area 14 is shown. According to the method of the invention, in the present example a pivoting movement 12 of the hand 6 combined with a viewing direction 5 in which the index finger of the hand 6 is pivoted from the starting point 12.1 to the end point 12.2 is associated with a control command by which a shifting 13 of the visual information 11 is initiated. The visual information 11 is shifted into a second display area 14 onto which the viewing direction 5.1 of the eyes 4 of the user 3 is directed upon the completion of the pivoting movement 12 at the end point 12.2. As in FIG. 2, the visual information 11 is shown upon completion of the pivoting movement 12 at the end point 12.2 in the second display area 14. In this embodiment the visual information 11 is shifted and displayed only into the second display area 14 aimed at by the user 3 in viewing direction 5.1.

Figure 4:
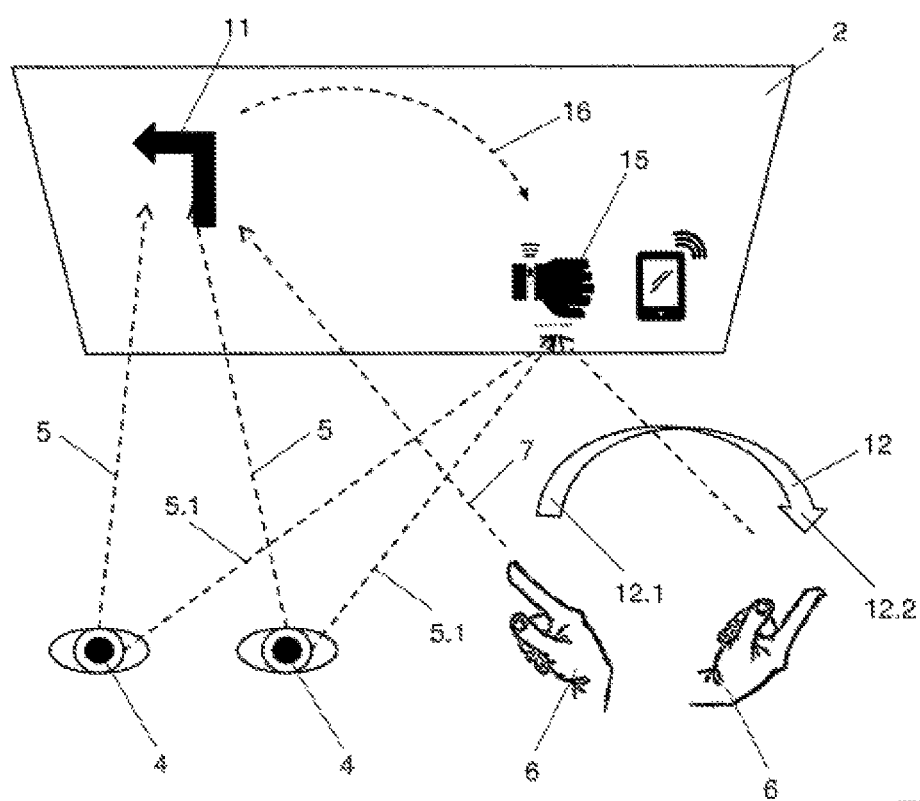
FIG. 4 shows a schematic view for explaining another embodiment of a method according to the aspects disclosed herein.

FIG. 4 shows a schematic view for explaining another exemplary embodiment of the method according to the invention in which a second, not shown display area display area 14 representing visual information 15 is graphically shown in display area 2. The visual information 15 representing the second display area 14 can be pre-set for a certain second display area 14. Furthermore, there is the possibility that the visual information 15 is inserted in the display area 2 as soon as a device comprising a second display area 14 or a device coupled to a second display area 14 is bundled into or registered in the communication network of the motor vehicle. This can be, for example, a smartphone or a smartwatch which is bundled via a wireless network into the communication network of the motor vehicle so that visual information can also be shifted into the display areas of such mobile end devices.

In order for the visual information 11 shown in the example as a navigation symbol in the display area 2 to be detected by the user 3, as in the embodiment shown in FIG. 2, the viewing direction 5 of the eyes 4 of the user 3 and the pointing direction 7 of a finger of the hand 6 of the user 3 are detected. A successful detection of the aimed-at visual information 11 can be reported back to the user 3 by a graphically visual, haptic and/or acoustic signal.

It can be provided in the present example that the changing of the viewing direction 5 to the viewing direction 5.1 and/or the pivoting movement 12 of the hand 6 or of the finger of the user 3 is/are simultaneously shown graphically in the first display area 2 as is indicated by the dotted arrow 16. As a consequence, it is possible for the user to move the visual information 11 similar to a mouse pointer or a mouse cursor over the display area 2.

In accordance with the invention, even in the present example a pivoting movement 12 of the hand 6 combined with a viewing direction 5 in which the index finger of the hand 6 is pivoted from the starting point 12.1 to the end point 12.2 is associated with a control command by which a shifting of the visual information 11 is initiated. As a consequence of the change of the viewing direction from the viewing direction 5 to the viewing direction 5.1 of the user 3, the visual information 11 in the display area 2 can be moved by the user 3 to the position of the visual information 15, as a result of which the visual information 11 is shifted into the second, not shown display area 14 represented by the visual information 15.

What is claimed is:

1. A method for the contactless shifting of visual information, comprising:
    associating a combination of a pivoting movement of a user and a viewing direction of the user directed at a first display with a control command for shifting visual information displayed in the first display inside a motor vehicle to a second display spatially decoupled from the first display in the motor vehicle;
    reporting a successful detection of the visual information to the user with one or more of a visual signal, an acoustic signal or a haptic signal; and
    initiating movement of the visual information from the first display to the second display in response to the combination of the viewing direction of the user directed at the first display and the pivoting movement of the user, wherein the visual information is removed from the first display and shown in the second display upon the completion of the pivoting movement of the user.

2. The method according to claim 1, wherein during the shifting of the visual information, operating rights coupled to the visual information are associated with at least one other user.

3. The method according to claim 1, wherein graphical information representing the second display is represented in the first display, and wherein the visual information is shifted into the second display when the look and/or a finger of the user is directed toward the graphical information representing the second display.

4. The method according to claim 1, wherein the pivoting movement of the user is one of a pivoting movement of a hand of the user, a pivoting movement of a finger of the user, or a pivoting movement of a head of the user.

5. A system comprising:
 a first display inside a motor vehicle and operational to display visual information;
 a second display spatially decoupled from the first display in the motor vehicle; and
 a device operational to:
  associate a combination of a pivoting movement of a user and a viewing direction of the user directed at the first display with a control command for shifting the visual information displayed in the first display to the second display;
  report a successful detection of the visual information to the user with one or more of a visual signal, an acoustic signal or a haptic signal; and
  initiate movement of the visual information from the first display to the second display in response to the combination of the viewing direction of the user directed at the first display and the pivoting movement of the user, wherein the visual information is removed from the first display and shown in the second display upon the completion of the pivoting movement of the user.

6. The system according to claim 5, wherein the visual information is shifted into a display to which a look and a finger of the user is directed.

7. The system according to claim 5, wherein a successful shifting of the visual information is reported acoustically, haptically and/or visually.

8. The system according to claim 5, wherein during the shifting of the visual information, operating rights or user rights coupled to the visual information are transferred.

9. The system according to claim 5, wherein the visual information is transmitted to a display bound to a seat if another user on the seat is registered.

10. The system according to claim 5, wherein the control command for shifting the visual information is combined with acoustic information of the user.

11. The system according to claim 5, wherein the visual information is shifted into a display of a mobile device.

12. The system according to claim 5, wherein graphical information representing the second display is represented in the first display, and wherein the visual information is shifted into the second display when a look and/or a finger of the user is directed toward the graphical information representing the second display.

13. An instrument cluster of a motor vehicle comprising:
 a first display inside the motor vehicle and operational to display visual information; and
 a second display spatially decoupled from the first display in the motor vehicle; wherein:
  a combination of a pivoting movement of a user and a viewing direction of the user directed at the first display is associated with a control command for shifting the visual information displayed in the first display to the second display;
  a successful detection of the visual information is reported to the user with one or more of a visual signal, an acoustic signal or a haptic signal;
  movement of the visual information from the first display to the second display is initiated in response to the combination of the viewing direction of the user directed at the first display and the pivoting movement of the user; and
  the visual information is removed from the first display and shown in the second display upon the completion of the pivoting movement of the user.

14. The instrument cluster according to claim 13, wherein during the shifting of the visual information, operating rights coupled to the visual information are associated with at least one other user.

15. The instrument cluster according to claim 13, wherein the visual information is shifted into a display localized outside of the motor vehicle.

16. The instrument cluster according to claim 13, wherein during the shifting of the visual information, data representing the visual information is transferred via a wireless network.

17. The instrument cluster according to claim 13, wherein the pivoting movement of the user is one of a pivoting movement of a hand of the user, a pivoting movement of a finger of the user, or a pivoting movement of a head of the user.

18. The instrument cluster according to claim 13, wherein the pivoting movement of the user includes a starting point and an ending point.

19. The instrument cluster according to claim 18, wherein the starting point includes one of the viewing direction and a pointing direction directed at the visual information in the first display.

20. The instrument cluster according to claim 18, wherein the ending point includes one of the viewing direction and a pointing direction directed at the second display.

* * * * *